US012123600B2

(12) United States Patent
Konowalczyk

(10) Patent No.: US 12,123,600 B2
(45) Date of Patent: Oct. 22, 2024

(54) REDUCED TEMPERATURE WATER SUPPLY MODE IN A WATER PROVISION SYSTEM

(71) Applicant: OCTOPUS ENERGY HEATING LIMITED, London (GB)

(72) Inventor: Peter Konowalczyk, London (GB)

(73) Assignee: OCTOPUS ENERGY HEATING LIMITED, London (GB)

( * ) Notice: Subject to any disclaimer, the term of this patent is extended or adjusted under 35 U.S.C. 154(b) by 0 days.

(21) Appl. No.: 18/276,004

(22) PCT Filed: Feb. 7, 2022

(86) PCT No.: PCT/IB2022/051068
§ 371 (c)(1),
(2) Date: Aug. 4, 2023

(87) PCT Pub. No.: WO2022/168037
PCT Pub. Date: Aug. 11, 2022

(65) Prior Publication Data

US 2024/0093885 A1    Mar. 21, 2024

(30) Foreign Application Priority Data

Feb. 7, 2021  (GB) ...................................... 2101678
Jul. 2, 2021   (GB) ...................................... 2109593
(Continued)

(51) Int. Cl.
*F24D 19/10*       (2006.01)
(52) U.S. Cl.
CPC ...... *F24D 19/1054* (2013.01); *F24D 2200/12* (2013.01); *F24D 2220/04* (2013.01); *F24D 2220/10* (2013.01)

(58) Field of Classification Search
CPC ............. F24D 19/1054; F24D 2200/04; F24D 2200/10; F24D 2200/12; G06N 20/00; F24H 15/156
See application file for complete search history.

(56) References Cited

U.S. PATENT DOCUMENTS 4,798,059 A      1/1989  Morita
2011/0271953 A1  11/2011 Wortmann et al.
(Continued)

FOREIGN PATENT DOCUMENTS

AT     504285 A1   4/2008
CN    201191144 Y  2/2009
(Continued)

OTHER PUBLICATIONS

Office Action of the Japan Patent Office in related Japanese Patent Appl. No. 2023-547365, dated Mar. 5, 2024, 8 pages.
(Continued)

*Primary Examiner* — Edelmira Bosques
*Assistant Examiner* — Michael James Giordano
(74) *Attorney, Agent, or Firm* — Bochner PLLC; Andrew D. Bochner

(57) ABSTRACT

A heater arrangement system for a water provision system for controlling a water supply provided to a water outlet, the water outlet being arranged to provide heated water to a user, the heater arrangement system comprising: a water heating device disposed remotely from the water outlet; and a control unit communicatively coupled to the water heating device, the control unit being configured to: receive a request from a user to enable a reduced temperature water supply mode, which provides for heated water to be supplied to the water outlet at a first temperature for a fixed period of time and then provides for the temperature to be lowered to a second temperature once the fixed time has elapsed; and (Continued)

for a user for which the request has been received, upon detecting that the user has opened the water outlet, providing heated water at the first temperature for a first period of time, then reducing the temperature of the heated water from the first temperature to a second temperature lower than the first temperature after the first period of time has elapsed.

15 Claims, 3 Drawing Sheets

(30) Foreign Application Priority Data

| Date | Country | Number |
|---|---|---|
| Jul. 2, 2021 | (GB) | 2109594 |
| Jul. 2, 2021 | (GB) | 2109596 |
| Jul. 2, 2021 | (GB) | 2109597 |
| Jul. 2, 2021 | (GB) | 2109598 |
| Jul. 2, 2021 | (GB) | 2109599 |
| Jul. 2, 2021 | (GB) | 2109600 |
| Aug. 2, 2021 | (GB) | 2111070 |

(56) References Cited

U.S. PATENT DOCUMENTS

| | | |
|---|---|---|
| 2016/0010878 A1 | 1/2016 | Lee et al. |
| 2018/0038616 A1 | 2/2018 | Scheers et al. |
| 2021/0318027 A1 | 10/2021 | Boros et al. |

FOREIGN PATENT DOCUMENTS

| | | | |
|---|---|---|---|
| CN | 201265954 Y | | 7/2009 |
| CN | 102305467 A | | 1/2012 |
| CN | 203758014 U | | 8/2014 |
| CN | 108050707 A | * | 5/2018 |
| CN | 111189348 A | | 5/2020 |
| CN | 111750528 A | | 10/2020 |
| CN | 111811142 A | | 10/2020 |
| DE | 29921889 U1 | | 6/2000 |
| DE | 10006564 A1 | | 8/2000 |
| DE | 10151253 C1 | | 11/2002 |
| DE | 102008043030 A1 | | 4/2010 |
| DE | 102014225693 A1 | | 6/2016 |
| EP | 0007538 A1 | | 2/1980 |
| EP | 1684035 A2 | | 7/2006 |
| EP | 3173703 A1 | | 5/2017 |
| JP | S5795534 A | | 6/1982 |
| JP | S5812992 A | | 1/1983 |
| JP | H01256792 A | | 10/1989 |
| JP | H08190392 A | | 7/1996 |
| JP | 2007078314 A | | 3/2007 |
| JP | 2012002469 A | | 1/2012 |
| JP | 2013221686 A | | 10/2013 |
| JP | 2014173752 A | | 9/2014 |
| KR | 20100030141 A | | 3/2010 |
| WO | 2020001746 A1 | | 1/2020 |
| WO | 2020209979 A2 | | 10/2020 |

OTHER PUBLICATIONS

Search Report of the United Kingdom Patent Office in related UK Patent Appl. No. GB2109593.0, dated Aug. 20, 2021, 1 page.
Search Report of the United Kingdom Patent Office in related UK Patent Appl. No. GB2109594.8, dated Aug. 12, 2021, 1 page.
Search Report of the United Kingdom Patent Office in related UK Patent Appl. No. GB2109596.3, dated Aug. 10, 2021, 1 page.
Search Report of the United Kingdom Patent Office in related UK Patent Appl. No. GB2109597.1, dated Aug. 10, 2021, 1 page.
Search Report of the United Kingdom Patent Office in related UK Patent Appl. No. GB2109598.9, dated Aug. 10, 2021, 1 page.
Examination Report of the United Kingdom Patent Office in related UK Patent Appl. No. GB2109599.7, dated Feb. 14, 2023, 2 pages.
Search Report of the United Kingdom Patent Office in related UK Patent Appl. No. GB2109599.7, dated Aug. 10, 2021, 1 page.
Search Report of the United Kingdom Patent Office in related UK Patent Appl. No. GB2109600.3, dated Aug. 20, 2021, 1 page.
Search Report of the United Kingdom Patent Office in related UK Patent Appl. No. GB2215387.8, dated Jan. 16, 2023, 1 page.
Search Report of the United Kingdom Patent Office in related UK Patent Appl. No. GB2300970.7, dated Feb. 20, 2023, 2 pages.
Search Report of the United Kingdom Patent Office in related UK Patent Appl. No. GB2304349.0, dated Apr. 25, 2023, 1 page.
Search Report of the United Kingdom Patent Office in related UK Patent Appl. No. GB2111070.5, dated Aug. 27, 2021, 1 page.
International Search Report and Written Opinion of the International Searching Authority in relation to International Application No. PCT/IB2022/051068, dated Jun. 9, 2022, 9 pages.

* cited by examiner

REDUCED TEMPERATURE WATER SUPPLY MODE IN A WATER PROVISION SYSTEM

The present disclosure relates generally to water/energy flow utility management in a water provision system, such as a heater arrangement system for a water provision system for supplying hot water to a plurality of water outlets (taps) in a building. In particular, the present disclosure relates to implementation of a reduced temperature water supply mode (or budget) for the reduction of water and/or energy flow waste to water outlets, in a water provision system to conserve water and/or energy.

BACKGROUND

Whether it is in a commercial or domestic setting, heated water is required throughout the day all year round. It goes without saying that the provision of heated water requires both clean water and a source of heat. To provide heated water, a heating system is provided to an often centralized water provision system to heat water up to a predetermined temperature e.g. set by a user, and the heat source used is conventionally one or more electric heating elements or burning of natural gas. Generally, during periods of high energy (e.g. gas or electricity) demand utilities providers would implement a peak tariff which increases the unit cost of energy, partly to cover the additional cost of having to purchase more energy to supply to customers and partly to discourage unnecessary energy usage. Then, during periods of low energy demand utilities providers would implement an off-peak tariff which lowers the unit cost of energy to incentivise customers to switch to using energy during these off-peak periods instead of peak periods to achieve an overall more balanced energy consumption over time. However, such strategies are only effective if customers are always aware of the changes in tariffs and in addition make a conscious effort to modify their energy consumption habits.

Clean water as a utility is currently receiving much attention. As clean water becomes scarcer, there has been much effort to educate the public on the conservation of clean water as well as development of systems and devices that reduce water consumption, such as aerated showers and taps to reduce water flow, showers and taps equipped with motion sensors that stop the flow of water when no motion is detected, etc. However, these systems and devices are restricted to a single specific use and only have limited impact on problematic water consumption habits.

With growing concerns over the environmental impact of energy consumption, there has been a recent growing interest in the use of heat pump technologies as a way of providing domestic heated water. A heat pump is a device that transfers thermal energy from a source of heat to a thermal reservoir. Although a heat pump requires electricity to accomplish the work of transferring thermal energy from the heat source to the thermal reservoir, it is generally more efficient than electrical resistance heaters (electrical heating elements) as it typically has a coefficient of performance of at least 3 or 4. This means under equal electricity usage 3 or 4 times the amount of heat can be provided to users via heat pumps compared to electrical resistance heaters.

The heat transfer medium that carries the thermal energy is known as a refrigerant. Thermal energy from the air (e.g. outside air, or air from a hot room in the house) or a ground source (e.g. ground loop or water filled borehole) is extracted by a receiving heat exchanger and transferred to a contained refrigerant. The now higher energy refrigerant is compressed, causing it to raise temperature considerably, where this now hot refrigerant exchanges thermal energy via a heat exchanger to a heating water loop. In the context of heated water provision, heat extracted by the heat pump can be transferred to water in an insulated tank that acts as a thermal energy storage, and the heated water may be used at a later time when needed. The heated water may be diverted to one or more water outlets, e.g. a tap, a shower, a radiator, as required. However, a heat pump generally requires more time compared to electrical resistance heaters to get water up to the desired temperature.

Since different households, workplaces and commercial spaces have different requirements and preferences for heated water usage, new ways of heated water provision are desirable in order to enable heat pumps to be a practical alternative to electrical heaters. Moreover, in order to conserve energy and water, it may be desirable to modulate the consumption of energy and clean water; however, modulating utility consumption cannot simply be a blanket cap on usage.

It is therefore desirable to provide for the modulating of utility consumption in a water provision system.

SUMMARY

The invention provides a heater arrangement system for a water provision system for controlling a water supply provided to a water outlet, as claimed in claim 1.

The invention also provides a method of controlling a water supply provided to a water outlet, as claimed in claim 10.

The invention further provides a corresponding computer program product and a control module, as claimed in claims 14 and 15.

BRIEF DESCRIPTION OF THE DRAWINGS

Embodiments of the present disclosure will now be described with reference to the accompanying drawings, in which.

DETAILED DESCRIPTION

Figure 1:
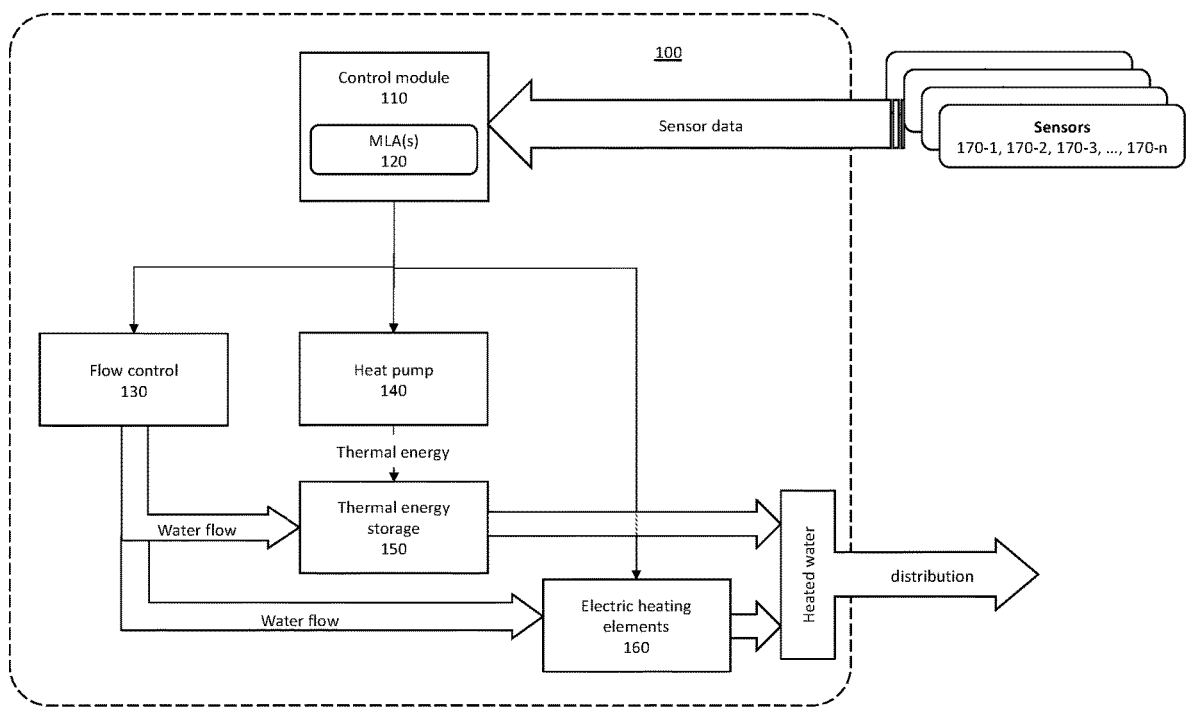
FIG. 1 is a schematic system overview of an exemplary water provision system.

In view of the foregoing, the present disclosure provides various approaches for the provision of heated water using or assisted by a heat pump, and in some cases for modulating the use of utilities including water and energy to reduce water and energy wastage. The present approaches may be implemented through the use of one or more machine learning algorithm (MLA) trained to control and modulate water provision for a water provision system via a control module based on sensor data received from the water provision system. For example, during a training phase, the MLA may monitor heated water usage of a household in a domestic setting and establish a normal usage pattern. The MLA may be trained to recognise different types of water usage (e.g. shower, hand wash, heating, etc.) based on a number of different input such as the time of the day, the day of the week, the date, the weather, etc. In some embodiments, the MLA may collect additional data, for example, on the time when a water outlet of the system is turned on and off, the duration of use, the water temperature set by the user and the actual water temperature when heated water is provided to the user. In use, the MLA may use the learned usage pattern in a variety of different ways to improve the efficiency and effectiveness of heated water provision using or assisted by a heat pump.

In some embodiments, the MLA may be trained to implement one or more energy-saving strategies when or before a water outlet is turned on, and optionally to implement one or more interactive strategies to help modify water and energy usage habits e.g. to gradually reduce water and/or energy usage.

The following gives a brief overview of a number of different types of machine learning algorithms for embodiments in which one or more MLAs are used. However, it should be noted that the use of an MLA to establish a normal usage pattern is only one way of implementing the present techniques but it is not essential; in some embodiments, a control module may be programmed with appropriate software functions to target specific heated water usage, e.g. excessive water flow, and to respond in a predetermined manner.

Overview of MLAs

There are many different types of MLAs known in the art. Broadly speaking, there are three types of MLAs: supervised learning-based MLAs, unsupervised learning-based MLAs, and reinforcement learning based MLAs.

Supervised learning MLA process is based on a target—outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning-based MLAs include: Regression, Decision Tree, Random Forest, Logistic Regression, etc.

Unsupervised learning MLA does not involve predicting a target or outcome variable per se. Such MLAs are used for clustering a population of values into different groups, which is widely used for segmenting customers into different groups for specific intervention. Examples of unsupervised learning MLAs include: Apriori algorithm, K-means.

Reinforcement learning MLA is trained to make specific decisions. During training, the MLA is exposed to a training environment where it trains itself continually using trial and error. The MLA learns from past experience and attempts to capture the best possible knowledge to make accurate decisions. An example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Neural Networks (NN)

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation when what happens in the "box" is unimportant.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

Deep Neural Networks

In some non-limiting embodiments of the present technology, the NN can be implemented as a deep neural network. It should be understood that NNs can be classified into various classes of NNs and one of these classes comprises recurrent neural networks (RNNs).

Recurrent Neural Networks (RNNs)

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Residual Neural Network (ResNet)

Another example of the NN that can be used to implement non-limiting embodiments of the present technology is a residual neural network (ResNet).

Deep networks naturally integrate low/mid/high-level features and classifiers in an end-to-end multilayer fashion, and the "levels" of features can be enriched by the number of stacked layers (depth).

To summarize, the implementation of at least a portion of the one or more MLAs in the context of the present technology can be broadly categorized into two phases—a training phase and an in-use phase. First, the given MLA is trained in the training phase using one or more appropriate training data sets. Then, once the given MLA learned what data to expect as inputs and what data to provide as outputs, the given MLA is run using in-use data in the in-use phase.

Water Provision System

In embodiments of the present techniques, cold and heated water is provided by a centralized water provision system to a plurality of water outlets, including taps, showers, radiators, etc., for a building in a domestic or commercial setting. An exemplary water provision system according to an embodiment is shown in FIG. 1. In the present embodiment, the water provision system 100 comprises a control module 110, the control module 110 may include Machine Learning Algorithms, 120. The control module 110 is communicatively coupled to, and configured to control, various elements of the water provision system, including flow control 130 for example in the form of one or more valves arranged to control the flow of water internal and external to the system, a (ground source or air source) heat pump 140 configured to extract heat from the surrounding and deposit the extracted heat in a thermal energy storage 150 to be used to heat water, and one or more electric heating elements 160 configured to directly heat cold water to a desired temperature by controlling the amount of energy supplied to the electric heating elements 160. Heated water, whether heated by the thermal energy storage 150 or heated by the electric heating elements 160, is then directed to one or more water outlets as and when needed. In the embodiments, the heat pump 140 extracts heat from the surrounding into a thermal energy storage medium within the thermal energy storage 150 until the thermal energy storage medium reach an operation temperature, then cold water e.g. from the mains can be heated by the thermal energy storage medium to the desired temperature. The heated water may then be supplied to various water outlets in the system.

In the present embodiment, the control module 110 is configured to receive input from a plurality of sensors 170-1, 170-2, 170-3, . . . , 170-$n$. The plurality of sensors 170-1, 170-2, 170-3, . . . , 170-$n$ may for example include one or more air temperature sensors disposed indoor and/or outdoor, one or more water temperature sensors, one or more water pressure sensors, one or more timers, one or more motion sensors, and may include other sensors not directly linked to the water provision system 100 such as a GPS signal receiver, calendar, weather forecasting app on e.g. a smartphone carried by an occupant and in communication with the control module via a communication channel. The control module 110 is configured, in the present embodiment, to use the received input to perform a variety of control functions, for example controlling the flow of water through the flow control 130 to the thermal energy storage 150 or electric heating elements 160 to heat water.

While a heat pump is generally more energy efficient for heating water compared to an electrical resistance heater, a heat pump requires time to start up as it performs various checks and cycles before reaching a normal operation state, and time to transfer sufficient amount of thermal energy into a thermal energy storage medium before reaching the desired operation temperature. On the other hand, an electrical resistance heater is generally able to provide heat more immediately. Thus, a heat pump can take longer to heat the same amount of water to the same temperature compared to an electrical resistance heater. Moreover, in some embodiments, the heat pump 140 may for example use a phase change material (PCM), which changes from a solid to a liquid upon heating, as a thermal energy storage medium. Additional time may therefore be required to for the heat pump to first transferred a sufficient amount of heat to turn the PCM from solid to liquid, if it has been allowed to solidify, before it can further raise the temperature of the liquified thermal storage medium. Although this approach of heating water is slower, it consumes less energy to heat water compared to electric heating elements, so overall, energy is conserved and the cost for providing heated water is reduced.

Phase Change Materials

In the present embodiments, a phase change material may be used as a thermal storage medium for the heat pump. One suitable class of phase change materials are paraffin waxes which have a solid-liquid phase change at temperatures of interest for domestic hot water supplies and for use in combination with heat pumps. Of particular interest are paraffin waxes that melt at temperatures in the range 40 to 60 degrees Celsius (° C.), and within this range waxes can be found that melt at different temperatures to suit specific applications. Typical latent heat capacity is between about 180 kJ/kg and 230 kJ/kg and a specific heat capacity of perhaps 2.27 $Jg^{-1}K^{-1}$ in the liquid phase, and 2.1 $Jg^{-1}K^{-1}$ in the solid phase. It can be seen that very considerable amounts of energy can be stored taking using the latent heat of fusion. More energy can also be stored by heating the phase change liquid above its melting point. For example, when electricity costs are relatively low during off-peak periods, the heat pump may be operated to "charge" the thermal energy storage to a higher-than-normal temperature to "overheat" the thermal energy storage.

A suitable choice of wax may be one with a melting point at around 48° C., such as n-tricosane $C_{23}$, or paraffin $C_{20}$-$C_{33}$, which requires the heat pump to operate at a temperature of around 51° C., and is capable of heating water to a satisfactory temperature of around 45° C. for general domestic hot water, sufficient for e.g. kitchen taps, shower/bathroom taps. Cold water may be added to a flow to reduce water temperature if desired. Consideration is given to the temperature performance of the heat pump. Generally, the maximum difference between the input and output temperature of the fluid heated by the heat pump is preferably kept in the range of 5° C. to 7° C., although it can be as high as 10° C.

While paraffin waxes are a preferred material for use as the thermal energy storage medium, other suitable materials may also be used. For example, salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3 \cdot 5H_2O$, which has a melting point around 48° C. to 49° C., and latent heat of 200-220 kJ/kg.

Overview of MLAs

There are many different types of MLAs (Machine Learning Algorithms) known in the art. There are many different types of MLAs (Machine Learning Algorithms) known in the art. Broadly speaking, there are three types of MLAs: supervised learning-based MLAs, unsupervised learning-based MLAs, and reinforcement learning based MLAs.

Supervised learning MLA process is based on a target—outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data.

Examples of supervised learning-based MLAs include: Regression, Decision Tree, Random Forest, Logistic Regression, etc.

Unsupervised learning MLA does not involve predicting a target or outcome variable per se. Such MLAs are used for clustering a population of values into different groups, which is widely used for segmenting customers into different groups for specific intervention. Examples of unsupervised learning MLAs include: Apriori algorithm, K-means.

Reinforcement learning MLA is trained to make specific decisions. During training, the MLA is exposed to a training environment where it trains itself continually using trial and error. The MLA learns from past experience and attempts to capture the best possible knowledge to make accurate decisions. An example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Neural Networks (NN)

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation when what happens in the "box" is unimportant.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

Deep Neural Networks

In some non-limiting embodiments of the present technology, the NN can be implemented as a deep neural network. It should be understood that NNs can be classified into various classes of NNs and one of these classes comprises recurrent neural networks (RNNs).

Recurrent Neural Networks (RNNs)

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUB), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Residual Neural Network (ResNet)

Another example of the NN that can be used to implement non-limiting embodiments of the present technology is a residual neural network (ResNet).

Deep networks naturally integrate low/mid/high-level features and classifiers in an end-to-end multilayer fashion, and the "levels" of features can be enriched by the number of stacked layers (depth).

To summarize, the implementation of at least a portion of the one or more MLAs in the context of the present technology can be broadly categorized into two phases—a training phase and an in-use phase. First, the given MLA is trained in the training phase using one or more appropriate training data sets. Then, once the given MLA learned what data to expect as inputs and what data to provide as outputs, the given MLA is run using in-use data in the in-use phase.

Figure 2:
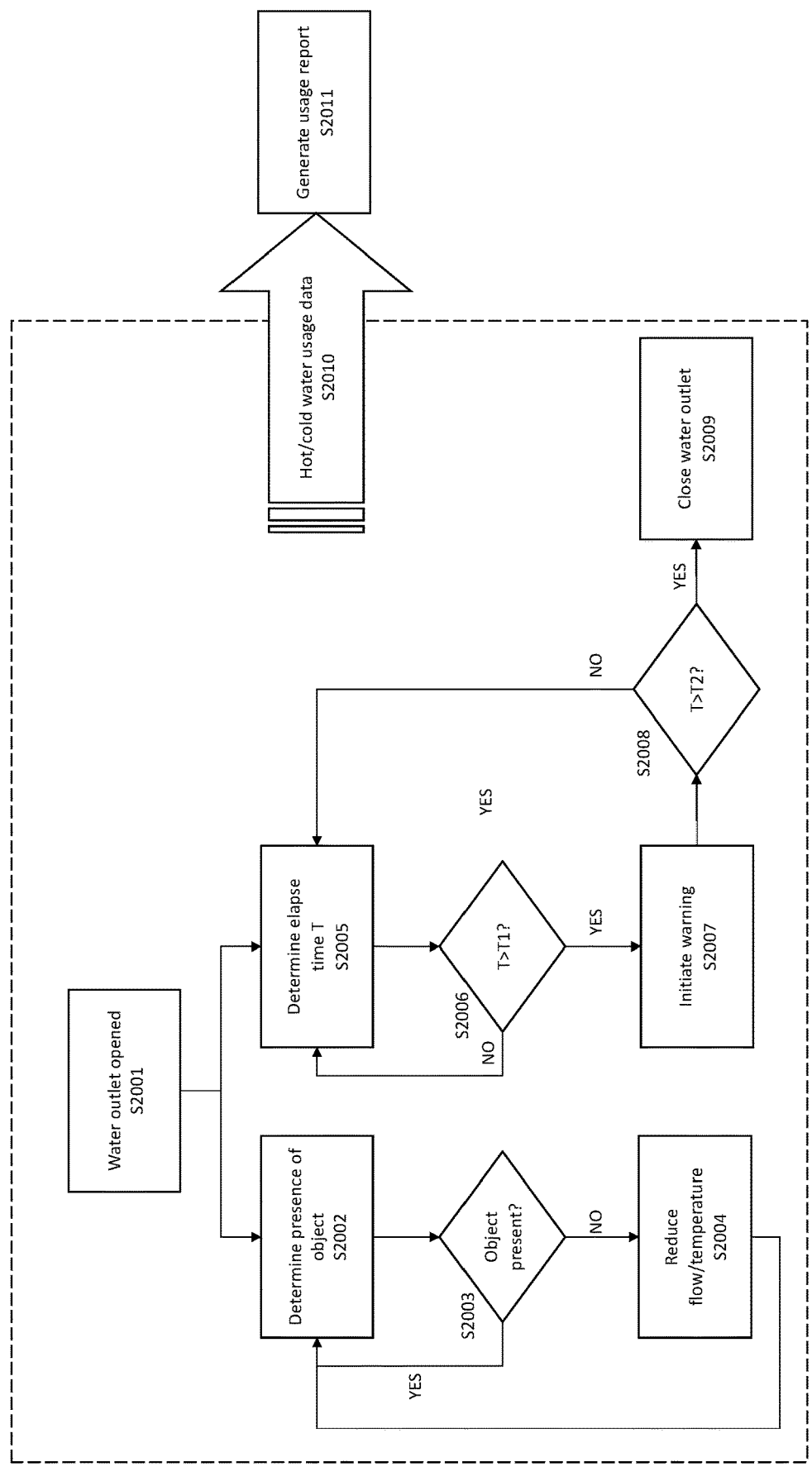
FIG. 2 is a flowchart showing the steps involved in temporarily reducing the flow of energy, and/or water, in an exemplary water provision system.

FIG. 2 shows an embodiment of a method for controlling utility usage, for example in a home environment. The method begins at S2001 when a water outlet (for example, a bathroom sink tap) is activated or turned on by a user to receive heated water supplied by a water heating system disposed remotely from the water outlet, the water heating system being controlled by a control module 110 of FIG. 1, disposed remotely from the water outlet and in communication with a sensor (for example, one of the sensors 170-n, shown in FIG. 1) disposed at or near the water outlet for sensing the presence of an object (for example, a hand of the person who is washing his hands) below the water outlet. At S2002, the control module 110 receives a signal from the sensor and determines at S2003 whether an object is present below the water outlet. If the control module determines that an object is present, the method returns to S2002 and the control module continues to monitor signals from the sensor. If the control module determines that there is no object below the water outlet, at S2004, the control module controls the water heating system to reduce the temperature of the heated water supplied to the water outlet and/or reduce the flow rate of the heated water supplied to the water outlet. The method then returns to S2002 and the control module continues to monitor signals from the sensor. In doing so, heated water may continue to be supplied to the water outlet but with reduced energy and/or water usage. For example, when the user is washing their hands with heated water under a tap, when the user removes their hands from under the tap to e.g. reach for the soap, the control module can reduce the temperature and the flow of heated water to conserve energy and water, then once the user return their hands to the tap, the temperature and the flow of heated water can be brought back to the initial level.

There may be instances when the user may forget to turn off the tap. Thus, in an alternative embodiment or in addition to the previous embodiment, upon the water outlet being activated to supply heated water, a timer in communication with the control module is activated to record an elapsed time. At S2005, the control module receives signals from the timer to determine the elapsed time T for the continuous provision of heated water from the water outlet. If the control module determines at S2006 that the elapse time T does not exceed a predetermined first threshold T1, the method returns to S2005 and the control module continues to monitor signals from the timer. If the control module determines at S2006 that the elapse time T exceeds the first threshold T1, the control module initiate a warning sequence at S2007, which may include producing a sound or activating a light signal at or near the water outlet to warn the user that the water outlet has been continuously on for a time T1 to prompt the user to turn the water outlet off if heated water is no longer needed. At S2008, the control module determines whether the elapse time T exceeds a predetermined second threshold T2, which is higher than the first threshold T1. If it is determined that the elapse time T does not exceeds the second threshold T2, the method returns to S2005 and the control module continues to monitor signals from the timer. If the control module determines at S2008 that the elapse time T exceeds the second threshold T2, the control module then controls the water heating system to cease provision of heated water to the water outlet at S2009. In doing so, energy and water are not wasted when heated water is no longer required. For example, if the user forgets to turn off the tap after washing hands, or if a child has left the tap on for play, provision of heated water can stop automatically to conserve energy and water. In addition to being predetermined values, the values of the two thresholds, T1 and T2, can also be determined by deriving a predicted value, according to an artificial intelligence algorithm (such as deep learning, or other MLA), which has been trained based on past usage of the water flow in the particular building, so that the warning is not generated, and the water does not turn off, in a situation where such use of the water is normal for the particular household or commercial building.

In an embodiment, heated water usage data (S2010) collected over time can be used to generate a usage report (S2011) as a tool to prompt a user to review and potentially modify their usage habits to reduce energy and water usage.

Figure 3:
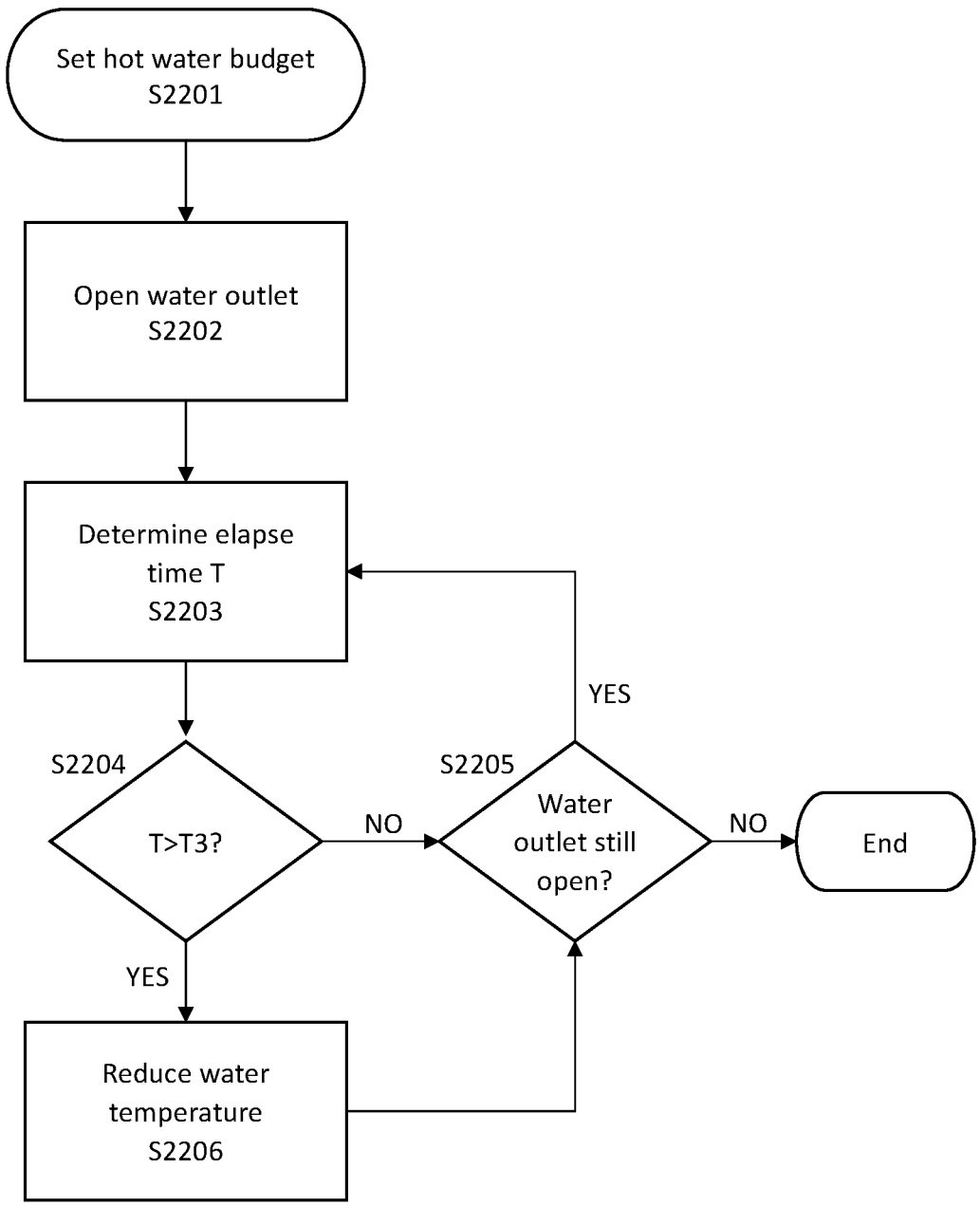
FIG. 3 is a flowchart showing the steps involved in implementing a reduced temperature water supply mode.

FIG. 3 shows an embodiment of a method for modulating the temperature of heated water based on a predetermined reduced temperature water supply mode, or budget. The method begins at S2201 by setting an energy mode and/or heated water usage mode. The mode may be set by a user through a user interface, or by a software function or artificial intelligence (AI) method that determines a cost-effective mode based e.g. on average use. Upon a user activating or turning on a water outlet to receive heated water at S2202, the control module at S2203 determines an elapse time T e.g. as described above. At S2204, if the control module determines that the elapse time T exceeds a predetermined third threshold T3, the control module controls the water heating system to reduce the temperature of the heated water supplied to the water outlet at S2206 from a first temperature set by the user upon turning on the water outlet to a predetermined second lower temperature. Preferably, this reduction of temperature is a gradual reduction in temperature, rather than an abrupt one, so as, for example, not to provide a shock to a user who has become adjusted to the higher temperature, for example, while taking a shower. The gradual reduction rate could be, for example, 1 degree Celsius every 5 seconds.

At S2204, if the control module determines that the elapse time T does not exceed the third threshold T3, the control module determines at S2205 whether the water outlet is still supplying heated water, for example based on a water flow from the water heating system. If it is determined that the water outlet is still supplying heated water, the method returns to S2203 and the control module continues to monitor the elapse time T. If it is determined that the water outlet is no longer supplying heated water, the method ends. In the present embodiment, the third threshold T3 and the second temperature are set by the control module based on the energy budget and/or heated water usage budget. Thus, in doing so, it is possible to control and modulate heated water usage to keep energy expenditure to a budget.

The AI method, or algorithm, (e.g., MLAs 120 in FIG. 1), preferably predicts the values of the first and second temperatures, as well as the value of the time period, after having been trained by training data based on past usage of the water provision system by the user.

The control module 110 is programmed in software to carry out the functions described above and illustrated in the steps of FIG. 2. Alternatively, the control module is hardwired in hardware logic to perform the functions described above.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A heater arrangement system for a water provision system for controlling a water supply provided to a water outlet, the water outlet being arranged to provide heated water to a user, the heater arrangement system comprising:
   a water heating device disposed remotely from the water outlet; and
   a control unit communicatively coupled to the water heating device, the control unit being configured to:
   a) receive a request from a user to enable a reduced temperature water supply mode, which provides for heated water to be supplied to the water outlet at a first temperature for a fixed first period of time and then provides for the temperature to be lowered to a second temperature once the fixed first period of time has elapsed; and
   b) for a user for which the request in a) has been received, upon detecting that the user has opened the water outlet, providing heated water at the first temperature for the fixed first period of time, then reducing the temperature of the heated water from the first temperature to the second temperature lower than the first temperature after the first fixed period of time has elapsed;
   wherein the first and second temperatures are set by an artificial intelligence algorithm executed by the control unit;
   wherein the first period of time is set by an artificial intelligence algorithm executed by the control unit;
   wherein the artificial intelligence algorithm predicts the values of the first and second temperatures, based on data associated with past usage of the water provision system;
   wherein the artificial intelligence algorithm predicts the values of the fixed first period of time, based on data associated with past usage of the water provision system; and
   wherein the predicted values are derived by the artificial intelligence algorithm after the algorithm has been trained by training data associated with past usage of the water provision system.

2. The heater arrangement system of claim 1, wherein the request at a) is initiated by the user through a user interface.

3. The heater arrangement system of claim 1, wherein the temperature is gradually reduced from the first temperature to the second temperature, after the fixed first period of time has elapsed.

4. The heater arrangement system of claim 3, wherein a gradual reduction rate is 1 degree Celsius every 5 seconds.

5. The heater arrangement system of claim 1, wherein the water heating device comprises a heat pump and a thermal energy storage device.

6. The heater arrangement system of claim 5, wherein the thermal energy storage device is a phase change material device.

7. The heater arrangement system of claim 6, wherein the phase change material is a paraffin wax.

8. The heater arrangement system of claim 7, wherein the paraffin wax melts at a temperature of 40 degrees to 60 degrees C.

9. The heater arrangement system of claim 6, wherein the latent heat capacity of the phase change material is between about 180 kJ/kg and 230 kJ/kg and a specific heat capacity of about 2.27 $Jg^{-1}K^{-1}$ in the liquid phase, and about 2.1 $Jg^{-1}K^{-1}$ in the solid phase.

10. A method of controlling a water supply provided to a water outlet in a water provision system, the water outlet being arranged to provide heated water to a user from a water heating device, the method comprising steps of:
 a) receiving a request from a user to enable a reduced temperature water supply mode, which provides for heated water to be supplied to the water outlet at a first temperature for a fixed first period of time and then provides for the temperature to be lowered to a second temperature once the fixed first period of time has elapsed; and
 b) for a user for which the request in a) has been received, upon detecting that the user has opened the water outlet, providing heated water at the first temperature for a fixed first period of time, then reducing the temperature of the heated water from the first temperature to the second temperature lower than the first temperature after the fixed first period of time has elapsed;
 wherein the first and second temperatures are set by an artificial intelligence algorithm executed by the control unit;
 wherein the fixed first period of time is set by an artificial intelligence algorithm executed by the control unit;
 wherein the artificial intelligence algorithm predicts the values of the first and second temperatures, based on data associated with past usage of the water provision system;
 wherein the artificial intelligence algorithm predicts the values of the first period of time, based on data associated with past usage of the water provision system; and
 wherein the predicted values are derived by the artificial intelligence algorithm after the algorithm has been trained by training data associated with past usage of the water provision system.

11. The method of claim 10, wherein the request at a) is initiated by the user through a user interface.

12. The method of claim 10, wherein the temperature is gradually reduced from the first temperature to the second temperature, after the fixed first period of time has elapsed.

13. The method of claim 12, wherein a gradual reduction rate is 1 degree Celsius every 5 seconds.

14. A computer-readable medium comprising machine-readable code, which, when executed by a processor, causes the processor to perform the method of claim 1.

15. A control module configured to control operation of a water provision system over a communication channel, the water provision system comprising a heating system configured to heat water from the mains and controlled by the control module, the water provision system being configured to provide water heated by the heating system to a user at one or more water outlets, the control module comprising a processor having software executing thereon, or having pre-configured hardware logic components, configured for performing the method of claim 1.

* * * * *